United States Patent [19]

Sasaki et al.

[11] Patent Number: 4,725,894

[45] Date of Patent: Feb. 16, 1988

[54] DIGITAL CONVERSION SYSTEM FOR A COLOR VIDEO SIGNAL THAT IS CAPABLE OF CONVERTING AN ANALOG COMPOSITE AND AN ANALOG COMPONENT VIDEO SIGNAL INTO A DIGITAL COMPOSITE SIGNAL AND A DIGITAL COMPONENT COLOR SIGNAL

[75] Inventors: Takayuki Sasaki, Kanagawa; Masaaki Arai, Tokyo, both of Japan

[73] Assignee: Sony Corporation, Tokyo, Japan

[21] Appl. No.: 654,151

[22] Filed: Sep. 25, 1984

[30] Foreign Application Priority Data

Sep. 26, 1983 [JP] Japan ................. 58-177298

[51] Int. Cl.⁴ .................... H04N 9/81; H04N 9/80
[52] U.S. Cl. ..................... 358/310; 358/330
[58] Field of Search ............. 358/310, 320, 323, 330, 358/339, 16, 18, 23, 28, 29, 30, 342

[56] References Cited

U.S. PATENT DOCUMENTS

| | | | |
|---|---|---|---|
| 3,255,303 | 6/1966 | Kihara | 358/330 |
| 4,023,200 | 5/1977 | Hess | 358/30 |
| 4,123,775 | 10/1978 | Bugni | 358/29 X |
| 4,188,638 | 2/1980 | de Haan | 358/320 |
| 4,207,589 | 6/1980 | Kawasaki | 358/28 |
| 4,268,852 | 5/1981 | Nakamura | 358/18 X |
| 4,335,393 | 6/1982 | Pearson | 358/310 |
| 4,346,399 | 8/1982 | Akutagawa et al. | 358/29 |
| 4,349,833 | 9/1982 | Clarke | 358/23 |
| 4,365,265 | 12/1982 | Tsujita et al. | 358/29 |
| 4,376,957 | 3/1983 | Dischert et al. | 358/310 X |
| 4,387,406 | 6/1983 | Ott | 358/310 |
| 4,456,930 | 6/1984 | Hashimoto | 358/320 X |
| 4,460,924 | 7/1984 | Lippel | 358/310 |
| 4,491,876 | 1/1985 | Aoike et al. | 358/330 |
| 4,520,385 | 5/1985 | Jackson et al. | 358/330 X |
| 4,520,401 | 5/1985 | Takahashi et al. | 358/310 |
| 4,549,201 | 10/1985 | Tanaka et al. | 358/310 X |
| 4,556,900 | 12/1985 | Willis | 358/23 |
| 4,558,351 | 12/1985 | Fling et al. | 358/28 |
| 4,567,507 | 1/1986 | Kusakabe et al. | 358/330 X |
| 4,574,301 | 3/1986 | Sachs | 358/18 |

*Primary Examiner*—Raymond F. Cardillo
*Assistant Examiner*—Wayne R. Young
*Attorney, Agent, or Firm*—Hill, Van Santen, Steadman & Simpson

[57] ABSTRACT

A digital conversion system for a color video signal comprising a system which selectively converts an analog composite color video signal and analog primary color video signals to digital signals includes: a matrix circuit (17) which forms a luminance signal and first and second color difference signals from the input analog primary color video signals; and a switching circuit (18) which converts the first and second color difference signals to a sequential color difference signal. A switch (28) selects the luminance signal from the matrix circuit (17) or the input NTSC analog composite color video signal. A first analog to digital converter (41) receives an output from the switch (28); and a second analog to digital converter (42) receives the sequential color difference signal. A digital composite color video signal or a digital luminance signal is obtained from the first analog to digital converter (41), and a digital line sequential color difference signal is obtained from the second analog to digital converter (42). The line sequential chrominance signal can be digitized by a single inexpensive A/D converter which has a slow processing speed, so as to produce an inexpensive digital conversion system which is small.

5 Claims, 8 Drawing Figures

DIGITAL CONVERSION SYSTEM FOR A COLOR VIDEO SIGNAL THAT IS CAPABLE OF CONVERTING AN ANALOG COMPOSITE AND AN ANALOG COMPONENT VIDEO SIGNAL INTO A DIGITAL COMPOSITE SIGNAL AND A DIGITAL COMPONENT COLOR SIGNAL

BACKGROUND OF THE INVENTION

1. Field of the Invention

The present invention relates in general to a digital conversion system for a color video signal wherein the analog color video signal is converted to a digital color video signal. This invention is particularly applicable where a composite color video signal and primary color video signals are selectively applied.

2. Description of the Prior Art

In a magnetic recording apparatus for example, which records a composite color video signal of the NTSC system and also can record component color video signals consisting of the three primary color signals, red, green and blue, apparatus such as shown in FIG. 1 is utilized in prior art systems wherein at least four analog to digital circuits are required.

In FIG. 1, for example, an analog composite color video signal is supplied to an input terminal 1 of an analog to digital converter 3 which has an output terminal 4. The analog component color video signals R (red), G (green) and B (blue) are respectively supplied to input terminals 2R, 2G, and 2B of analog to digital converters 5R, 5G and 5B, respectively. For the case when the input signal is a composite color video signal, the input terminal 1 is selected and an analog composite color video signal is supplied from the input terminal 1 to the A/D converter 3. The A/D converter 3 converts a wide band composite color video signal having a band width of about 6 MHz. An A/D converter which is capable of processing at high speeds is utilized for the analog to digital converter 3, and is supplied to the output terminal 4.

For the case where an input signal comprises component color video signals consisting of three primary color signals, the input terminals 2R, 2G and 2B are selected and the three primary color analog signals R, G and B are respectively supplied from the input terminals 2R, 2G and 2B to the analog to digital converters 5R, 5G and 5B. These A/D converters 5R, 5G and 5B respectively convert the wide band component color video signals R, G and B from analog to digital signals. Analog to digital converters which can process signals at high speeds are used for this purpose. The component color video signals R, G and B which have been digitized by the A/D converters 5R, 5G and 5B are supplied to a matrix circuit 6, which produces a luminance signal Y and color difference signals B-Y and R-Y which are supplied to the output terminals 7, 8 and 9, respectively.

Thus, conventional digital conversion systems such as illustrated in FIG. 1 require a total of four A/D converters 3, 5R, 5G and 5B to digitize a composite color video signal and three primary color component video signals R, G and B. Furthermore, such A/D converters must perform processing at high speed. The large number of A/D converters make the system very expensive which is a distinct disadvantage.

OBJECT AND SUMMARY OF THE INVENTION

It is an object of the present invention to provide an inexpensive digital conversion system using small scale circuits for color video signals in which composite color video signal and component color video signals consisting of the three primary color signals are selectively produced.

According to the invention, a digital conversion system for a color video signal which selectively converts an analog composite color video signal, an analog primary color video signals to digital signals is provided which comprises a matrix circuit which forms a luminance signal and first and second color difference signals from the primary color video analog signal as well as a circuit to convert the first and second color difference signals to a sequential color difference signal. The invention also provides a switching circuit for selecting the luminance signal from the matrix circuit and the analog composite color video signal. A first analog to digital converter receives an output of the switching circuit and a second analog to digital converter receives the sequential color difference signal and a digital composite color video signal or digital luminance signal is generated by the first analog to digital converted and the digital sequential color difference signal is generated by the second analog to digital converter.

Other objects, features and advantages of the invention will be apparent from the following description of certain preferred embodiments thereof taken in conjunction with the accompanying drawings, although variations and modifications may be effected without departing from the spirit and scope of the novel concepts of the disclosure and in which:

BRIEF DESCRIPTION OF THE DRAWINGS

FIG. 2 illustrates how FIGS. 2A and 2B fit together;

DESCRIPTION OF THE PREFERRED EMBODIMENTS

Figure 2A:
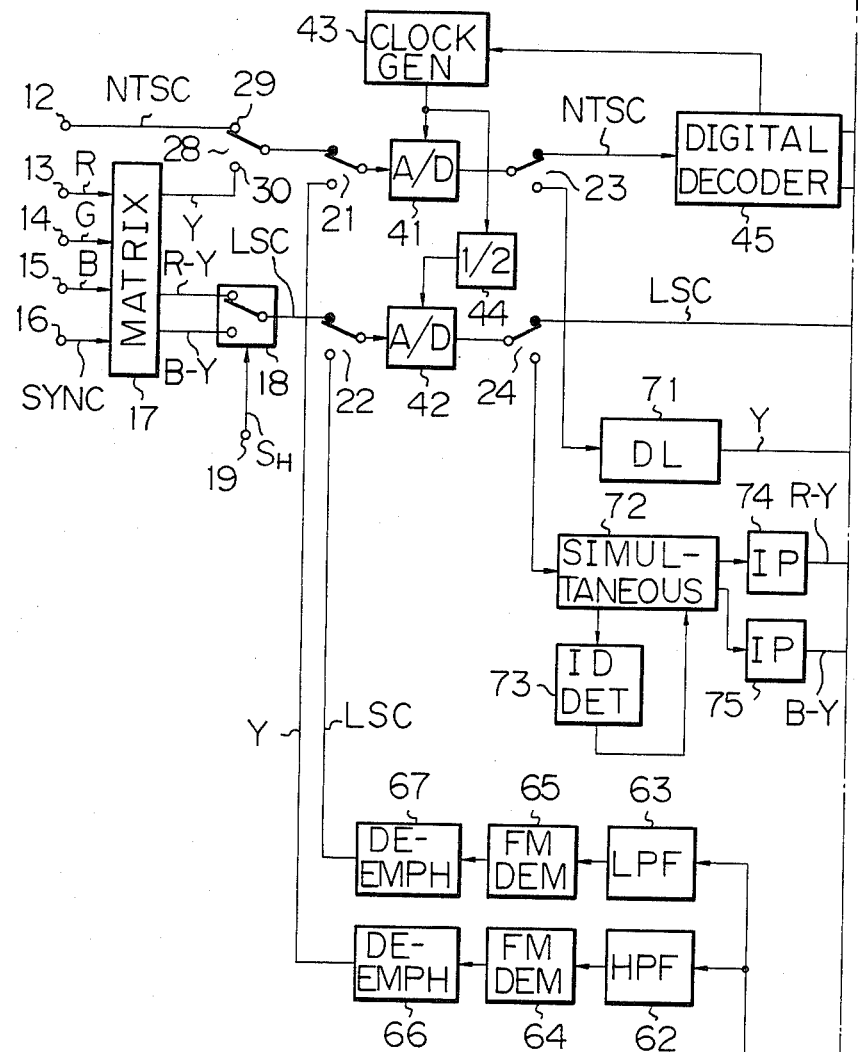
FIGS. 2A and 2B comprise a block diagram showing an embodiment of the invention.
Figure 2B:
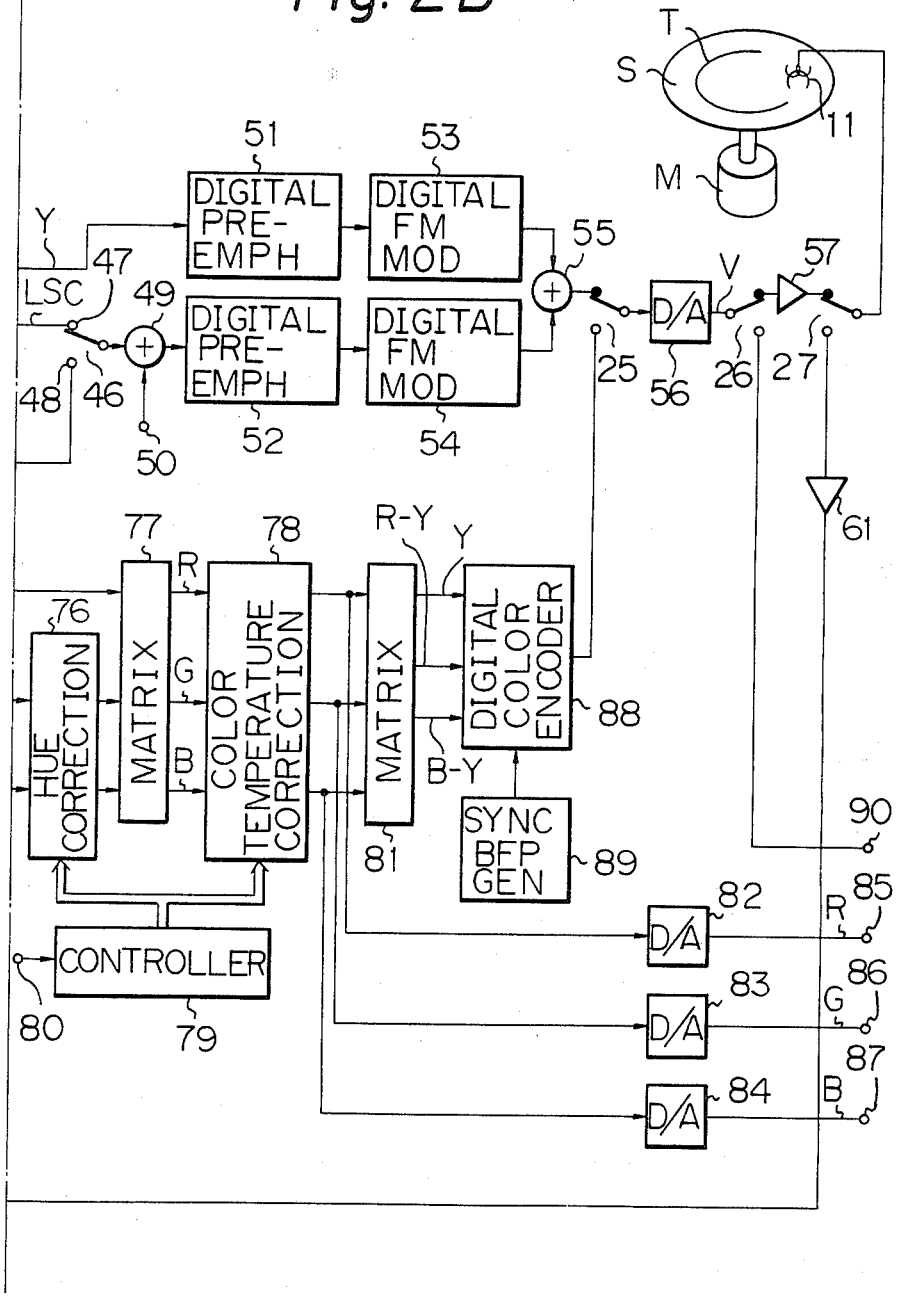

FIGS. 2A and 2B illustrate the entire arrangement of a recording and reproducing apparatus of a color video signal in which the invention is applied. The color video signal recording and reproducing apparatus records a color still picture signal of one frame (or one field) on one or two circular tracks T on a magnetic disc S using a fixed magnetic head 11. One magnetic sheet S is enclosed in a hard shell (not shown) and is rotated by a motor M. A large number of circular tracks can be formed on one magnetic sheet and the number of such tracks might be up to 100 or more tracks on a signal sheet. The magnetic sheet cassette is small and can be used as a recording medium for a still picture video camera.

The apparatus illustrated in FIGS. 2A and 2B is a signal processing arrangement wherein a color video signal can be recorded and reproduced.

Figure 1:
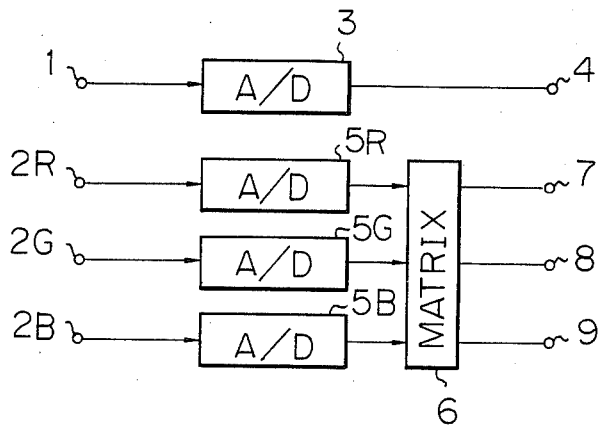
FIG. 1 is a block diagram which illustrates conventional prior art digital conversion systems for color video signals.
Figure 3:
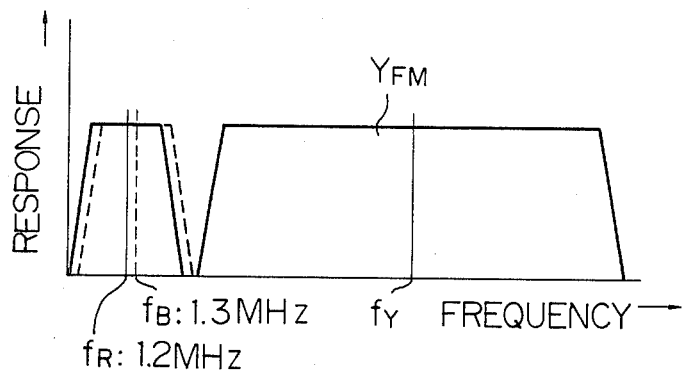
FIG. 3 is a frequency spectral diagram of a recording signal of one embodiment of the present invention.

The invention can record either a composite color video signal of the NTSC system or component color video signals consisting of three primary color signals. The composite color video signal is the main reproduced output and the component color video signals are produced for monitoring purposes. The signal which is recorded on a magnetic sheet S consists of an FM modulated luminance signal $Y_{FM}$ and an FM modulated line sequential chrominance signal. As shown in FIG. 3, a frequency spectrum of the recording signal is illustrated wherein the center frequency $f_Y$ of the signal $Y_{FM}$ is set at a predetermined frequency within a range of 6 to 7.5 MHz. The center frequency $f_R$ of an FM modulated red color difference signal R-Y is set to, for example, 1.2 MHz, and the center frequency $f_B$ of an FM modulated blue color difference signal B-Y is set to 1.3 MHz, for example. These two color difference signals are line-sequenced such that they alternately appear at every 1 H (one horizontal period). Such line-sequence conversion allows the band of the recording signal to be made narrower. The respective center frequencies of the two color difference signals are offset from each other so that a color sequence of the line sequence can be identified.

Also, the signal processing is substantially digitally performed so as to allow the operation to be stabilized and an integrated circuit arrangement can be easily and cheaply produced. In the invention, an A/D converter is provided on the input side of the signal processing section and a D/A converter is provided on the output side and these are commonly used both during recording and reproducing. Digital to analog converters are also provided to perform component color video signals for monitoring purposes.

Relative to FIGS. 2A and 2B, the NTSC color video signal is supplied to an input terminal 12 and the three primary color signals R, G and B are respectively supplied to input terminals 13, 14 and 15 from a color video camera, a microcomputer or other source and a composite sync signal SYNC corresponding to component color video signals consisting of the three primary color signals is supplied to an input terminal 16.

Figure 4A:
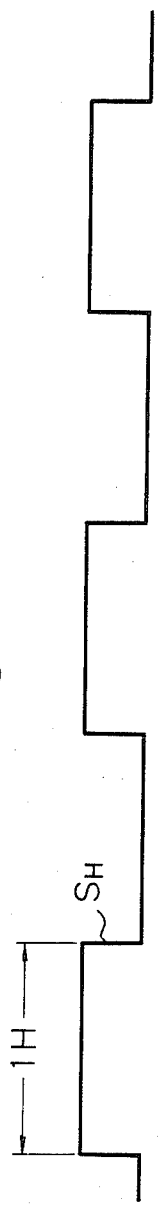
FIGS. 4A through 4C are time charts used to explain the invention illustrated in FIGS. 2A and 2B.
Figure 4B:
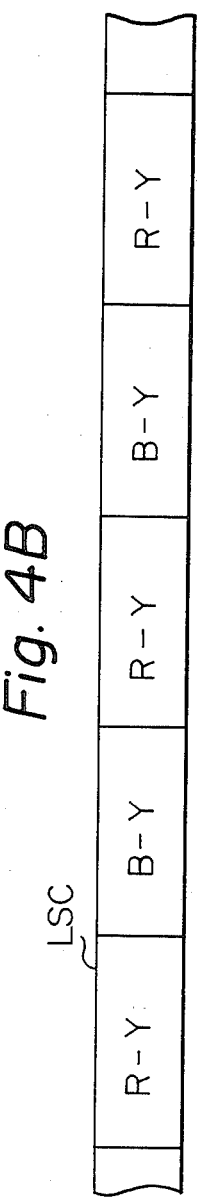

Input terminals 13, 14, 15 and 16 supply inputs to a matrix circuit 17 which converts the three primary colors to the luminance signal Y which is supplied to terminal 30 of switch 28. The red color difference signal R-Y is produced by the matrix circuit 17 and is supplied to one input terminal of a switching circuit 18. The matrix 17 also produces the blue color different signal B-Y which is supplied to the switching circuit 18. The two color difference signals which are supplied by the matrix circuit 17 to the input terminals of the switching circuit 18 are alternately supplied from the output terminal of switching circuit 18 at every 1 H in response to a switching pulse $S_H$ illustrated in FIG. 4A which is supplied to the switching circuit 18 at terminal 19. The switching circuit 18 generates a line sequential chrominance signal LSC illustrated in FIG. 4B. In FIGS. 2A and 2B whether the signals are analog or digital signals or recording or reproduced signals the luminance signal is represented by Y, the red color difference signal is represented by R-Y and the blue color difference signal B-Y.

The composite color video signal is represented by NTSC, the line sequential chrominance signal is indicated by LSC and the respective components of the three primary color signals are indicated by R, G and B.

A number of recording/reproduction change-over switches 21 through 27 may be commonly controlled to switch from recording to reproduction mode. Each of the change-over switches 21 through 27 have a recording terminal which in FIGS. 2A and 2B is indicated by a black dot as well as a reproducing terminal which is represented by a white circle. The switches 21 through 27 illustrated in FIGS. 2A and 2B are set so as to illustrate the position of the switches during recording. A switch 28 is switchable to supply the composite input signal from terminal 12 at which time the switch is in contact with contact 29 or the component input at which time the switch 28 is in contact with terminal 30 which receives the luminance signal from the matrix 17. The selected signal from switch 28 is supplied through switch 21 to an A/D converter 41 when the switch 21 is in the recording position. The line sequential chrominance signal LSC from the switching circuit 18 is supplied to an A/D converter 42 when a recording/reproducing change-over switch 22 is in the recording position.

A sampling clock signal having a frequency of $4f_{sc}$ where $f_{sc}$ is the color subcarrier frequency is supplied from a clock generator 43 to the A/D converter 41. The clock generator 43 also supplies an input to a one-half frequency divider 44 which produces a sampling clock frequency of $2f_{sc}$ which is supplied to the A/D converter 42. Digital data in which one sample consists of eight bits are obtained at the outputs of the A/D converters 41 and 42, respectively. The clock generator 43 generates a sampling clock signal which has a frequency and phase that are synchronized with the input signal. Control data from a digital decoder 45 is supplied to the clock generator 43. The digital decoder 45 receives the NTSC signal through switch 23 during the recording mode. Since the color difference signals have frequency bands which are narrower than the frequency band of the luminance signal they can be A/D converted at a sampling frequency of $2f_{sc}$ without any problem arising. The color subcarrier frequency is also called the color chrominance subcarrier frequency which in the NTSC system is 3.58 Mh. This is well known to those skilled in the art.

The digital decoder 45 performs the processing to separate the composite color video signal into a luminance signal and a carrier chrominance signal; as well as the processing to generate a control signal for the clock generator 43 from a burst signal which is included in the carrier chrominance signal. It also processesand digitally demodulates the carrier chrominance signal and does the processing to convert the two chrominance signals as demodulated outputs to the line sequential chrominance signal LSC.

The luminance signal Y from the digital decoder 45 is supplied to a digital pre-emphasis circuit 51. The line sequential chrominance signal LSC from the digital decoder 45 has a sampling rate of $2f_{sc}$ and this is supplied to one input terminal 47 of a switch 46. The line sequential chrominance signal LSC from the A/D converter 42 is supplied through the switch 24 to a second input terminal 48 of the switch 46. The line sequential chrominance signal which is transmitted through the switching circuit 46 is supplied to an adder 49.

An ID data signal is supplied from a terminal 50 to the adder 49. The ID data signal has different values depending upon the line of the red color difference signal R-Y and the line of the blue color different signal B-Y. The ID data causes the frequencies of the two color difference signals when FM modulation is not accomplished to be different. The output of the adder 49 is supplied to a digital pre-emphasis circuit 52. The output of the pre-emphasis circuit 51 is supplied to a digital FM modulator 53 and the output of digital pre-emphasis circuit 52 is supplied to a digital FM modulator 54. The modulated outputs $Y_{FM}$ and $(R-Y)_{FM}/(B-Y)_{FM}$ of the modulators 53 and 54 are supplied to a mixer 55 where they are mixed together.

Figure 4C:
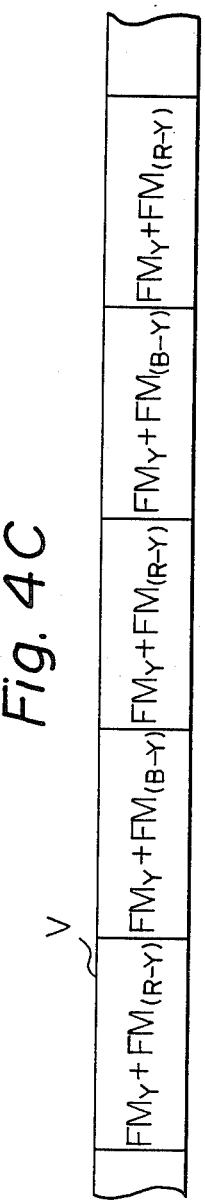

The output of the mixer 55 is supplied during recording through switch 25 to a D/A converter 56. An analog recording signal V illustrated in FIG. 4C which has a frequency spectrum illustrated in FIG. 3 is produced by the D/A converter 56. This recording signal is supplied to the magnetic head 11 through the recording side of switch 26, recording amplifier 57 and the recording terminal of switch 27. The signal to be recorded is recorded on the magnetic sheet S by magnetic head 11.

When in the reproduction mode the switches 21 through 27 are moved to the recording position which are the open circle contacts of the switches and the signal reproduced from the magnetic sheet S by the magnetic head is supplied through a reproducing amplifier 61 to a high pass filter 62 and to a low pass filter 63. The FM modulated luminance signal $Y_{FM}$ is produced at the output of the high pass filter 62 and the FM modulated line sequential chrominance signal $(R-Y)_{FM}/(B-Y)_{FM}$ is produced at the output of the low pass filter 63. The output of high pass filter 62 is supplied to an FM demodulator 64 which supplies an output to a de-emphasis circuit 66 which supplies the luminance signal Y to the reproduction contact of switch 21. The output of low pass filter 63 is applied to the FM demodulator 65 which supplies an output to the de-emphasis circuit 67 which produces the line sequential chrominance signal LSC which is supplied to the reproduction contact of switch 22. The A/D converter 41 receives the Y signal through switch 21 and converts the analog signal to a digital output signal. The line sequential chrominance signal LSC is supplied to A/D converter 42 through switch 22 and is converted to a digital signal. The digital luminance signal from A/D converter 41 is supplied to a delay circuit 71 through switch 23 and the digital line sequential chrominance signal from the A/D converter 42 is supplied to a simultaneous circuit 72 through the reproducing terminal of switch 24.

The simultaneous circuit 72 is constructed such that the line sequential two color difference signals are supplied to a series connection of two 1 H delay circuits and the input and output of the series connection of such 1 H delay circuits are added and the added output is divided by one-half and is supplied to first and third output terminals of the simultaneous circuit 72. Second and fourth output terminals of the simultaneous circuit are connected to the connecting point of the 1 H delay circuits. A mean value of the color difference signal of one of the first and third lines from the three continuous lines is produced at the first and third output terminals of the simultaneous circuit 72. The color difference signal of the second line is supplied from the second and fourth output terminals. Thus, the simultaneous red color difference signal R-Y can be separated by a switching circuit to select one of either the first and second output terminals. The simultaneous blue color difference signal B-Y can be separated by a switching circuit to select one of the third or fourth output terminals.

An ID detecting circuit is provided so as to allow the switching circuits of the simultaneous circuit 72 to accurately perform the above operations. The ID detecting circuit 73 detects the ID data which was added upon recording and determines the phase of a pulse to control the switching circuits to the correct phase in response to the ID data which is detected. The two color difference signals which are produced at the output of the simultaneous circuit 72 are supplied, respectively, to interpolators 74 and 75. Each of these interpolators 74 and 75 interpolates a mean value of two data before and behind an error data between the particular data. The color difference signal R-Y and the color difference signal B-Y for which the sampling rates were converted to a frequency of $4f_{sc}$ are obtained at the outputs of the interpolators 74 and 75. The conversion of the sampling rate is necessary to set the sampling rates so they are identical to the sampling rate of the digital luminance signal.

The digital color difference signals R-Y and B-Y from the interpolators 74 and 75 are supplied to a hue correcting or controlling circuit 76. The hue controller 76 changes the values of the two color difference signals which adjusts the phase of the hue of the chrominance signal from which both of them were synthesized. The color difference signals produced from the hue controller 76 and the luminance signal from the delay circuit 71 are supplied to a digital matrix circuit 77. The delay circuit 71 has the same delay as the delay of the color difference signals which occur in the signal lines from the simultaneous circuit 72 which are supplied to the matrix circuit 77.

The three primary color digital signals R, G and B are produced by the matrix 77 and are supplied to a color temperature correction circuit 78. Correction data is supplied to the hue controller 76 and to the color temperature correcting circuit 78 from a controller 79 which may comprise a microprocessor and a memory or storage means. The values of the correcting data are determined by control signals supplied to a terminal 80. The control signals are formed from a keyboard and knobs or levers used by the operator who is monitoring the hue and color temperature of a picture on the monitor, not shown.

The three primary color digital signals produced at the output of the color temperature correcting circuit 78 are supplied to a digital matrix circuit 81 and are also supplied to D/A converters 82, 83 and 84 which produce the analog component color video signals R, G and B which appear at output terminals 85, 86 and 87. The component color video signals are supplied to the input terminals of a color monitor image receiver, not shown.

The digital matrix circuit 81 produces the digital luminance signal Y and two color difference digital signals R-Y and B-Y which have been corrected for hue and color temperature and these signals are supplied to a color encoder 88. A synchronous and burst flag generating circuit 89 generates a synchronizing signal SYNC and a burst flag pulse BFP which is supplied to the digital color encoder 88. The digital NTSC composite color video signal is supplied from the output of the digital color encoder 88 through switch 25 to the D/A converter 56. The reproduced signal in the form of the analog composite color video signal is supplied from the output of the D/A converter 6 to output terminal 90 through switch 26. when in the reproduction mode.

In the present invention, in the case where the component color video signals consisting of three primary colors are selected and recorded, the luminance signal and the color difference signals are preliminarily formed from the analog component color video signals by the matrix circuit and then these color difference signals are converted to the line sequential chrominance signal having a narrow band width and are then digitized. Thus, the line sequential chrominance signal can be digitized by one A/D converter and for this A/D converter an inexpensive A/D converter can be selected which has a processing speed which is relatively low. This means that a less expensive A/D converter can be utilized.

Also, by providing a switching circuit which selects the luminance signal formed by the matrix circuit and the composite color video signal, the A/D converter required to digitize the luminance signal and the A/D converter required to digitize the composite color video signals can be commonly used as a single A/D converter. Thus, according to the present invention, a circuit which can digitize any of the composite color video signal and color component video signals consisting of the three primary color signals can be realized by a total of two A/D converters which are the A/D converter required to digitize the line sequential chrominance signal and the A/D converter which is required to digitize the luminance signal or composite color video signal. Also, the line sequential chrominance signal can be sufficiently digitized by an A/D converter which has a processing speed which is relatively low. This thus makes it possible to provide an inexpensive digital conversion system with a relatively small number of parts.

The line sequential color difference signals B-Y and R-Y have been used as an example in the foregoing embodiment of the invention, but it is to be realized that the invention is not limited to these particular signals but it can also be applied where I and Q signals are used as the line sequential color difference signals. Also, a sampling pulse of frequency 4$f_{sc}$ may be used as a sampling frequency to digitize the line sequential color difference signals. In the present description of the foregoing embodiment, the NTSC system signal has been used as the analog composite signal but the invention can also be utilized wherein a PAL signal system is processed.

The switch 28 would be in the 29 position when it is desired to supply the composite color video signal of the NTSC system to the apparatus. On the other hand, when it is desired to process the red, green and blue component color video signals comprising the three primary color signals and the sync signal 16 which is available from well known equipment, the switch 28 would be in the 30 position. The times for applying these signals are dependent upon the availability, in other words, if the NTSC signals are available and it is desired to process them, they would be processed and when the matrix signals are available and it is desired to process them, they would be processed. The digital decoder 45 derives the luminance signal Y and a carrier chrominance signal from the NTSC signal and such digital decoders are well known to those skilled in the art. Switch 46 is in position 47 when it is desired to process the LSC signal from the digital decoder 45. The switch 46 is in the 48 position when it is desired to receive the LSC signal from the A/D 42. In other words, the LSC signal can be either obtained from the NTSC source appearing at terminal 12 or it can be obtained from the analog to digital converter 42 which produces it from the color component signals supplied to the inputs at terminals 13, 14 and 15 after they pass the matrix 17 and switch 18. An input at terminal 50 is an ID data signal which is added to the input signal of the adder 49 and this ID data signal will have different values depending upon the line of the red color different signal R-Y and th eline of the color blue difference signal B-Y. Such signal is well known to those skilled in the art to which the present application pertains. The additional pre-emphasis circuits 51 and 52 and the digital FM modulator circuits 53 and 54 are prior art well known circuits known to those skilled in the art to which the present invention pertains. The simultaneous circuit 72, a hue correction circuit 76, the color temperature correction circuit 78 and the digital color encoder circuit 88 are well known to those skilled in the art to which the present invention pertains.

Although the invention has been described and shown with respect to a particular embodiment various changes and modifications which are obvious to those persons skilled in the art to which the invention pertains are within the scope and spirit of the present invention.

We claim as our invention:

1. A digital conversion system for a color video signal which selectively converts an analog composite color video signal of the NTSC system and analog component color video signals of three primary color signals into a digital composite signal and digital component color signals, respectively, comprising, a matrix circuit (17) which receives at its input said analog component color video signals and separates them into a luminance signal and a line sequential color difference signal, a first switch, a first analog to digital converter (41) connected to said first switch and selectively receiving the output of the circuit (17) or the analog composite color video signal of the NTSC system and selectively converting said composite color video signal or said separated luminance signal to digital signals, and a second analog to digital converter (42) receiving the line sequential color difference signal from said circuit (17) and converting said line sequential color difference signal to a digital signal, wherein said first analog to digital converter is an analog to digital converter which operates substantially at a high speed which is four times the color subcarrier frequency and said second analog to digital converter is an analog to digital converter which operates at a speed which is substantially lower than the speed of said first analog to digital converter which is such as two times the color subcarrier frequency, and further comprising, a digital decoder (45) connected to receive the output of said first analog to digital converter (41) and separating said composite color video signal into a luminance signal and a carrier chrominance signal, a first digital frequency modulator (53) receiving said luminance signal from said digital decoder (45) and frequency modulating a carrier signal therewith, a second digital frequency modulator (54) which receives an output from said second analog to digital converter (42) and frequency modulates a carrier signal therewith, an adder circuit (55) receiving the outputs of said first and second modulators and adding them, and a circuit (56, 57) including a digital to analog converter (56) receiving the output of said adder circuit (55) and converting it to an analog signal, and a second switch supplying said analog signal to means for magnetically recording said analog signal on a magnetic recording 2. A system according to claim 1, further comprising, analog reproducing circuits (61 to 67) for separating a color video signal recorded on said magnetic medium (S) connected to said second switch and producing a luminance signal and a line sequential color difference signal and for reproducing a demodulated luminance signal and a demodulated color difference signal, third and fourth switches receiving said demodulated luminance signal and said demodulated line sequential color difference signal and supplying said luminance signal and said demodulated line sequential color difference signal reproduced by said analog reproducing circuits to said first and second analog to digital converters (41, 42).

3. A system according to claim 2, further comprising, a simulataneous circuit (72), which receives the output of said second analog to digital converter, a first matrix circuit (77) receiving the output of said first analog to digital converter and an output of said simultaneous circuit (72) and producing digitized primary color signals from said reproduced luminance signal and a line sequential color difference signal respectively, a second matrix circuit (81) receiving the output of said first matrix circuit (77) and producing a luminance signal and simultaneous color difference signals from said primary color signals, a digital color encoder (88) receiving the output of said second matrix circuit (81) and encoding said signals into a composite signal, and a circuit supplying the output signal of said encoder (88) to said digital to analog converter (56) to converter it to an analog composite color signal.

4. A system according to claim 3, further comprising, digital to analog converting (82 to 84) receiving the outputs of said first matrix circuit (77) and respectively converting each chrominance signal of the digitized component signals, said reproduced luminance signal and reproduced line sequential color difference signal into analog component color signals.

5. A system according to claim 1, wherein said carrier signal frequency modulated by said digital color difference signals in said modulator (54) is modulated so that the FM modulation center frequency of the respective FM signals differ from each other.

* * * * *